5 Sheets—Sheet 1.

W. H. JOHNSON.
CUTTING MACHINE.

No. 77,985. Patented May 19. 1868

Witnesses:
Gideon Wells
F H Bray

Inventor:
William H. Johnson

5 Sheets—Sheet 5.

W. H. JOHNSON.
CUTTING MACHINE.

No. 77,985.          Patented May 19, 1868.

Witnesses:

Inventor:
William H. Johnson and# United States Patent Office.

WILLIAM H. JOHNSON, OF SPRINGFIELD, MASSACHUSETTS.

*Letters Patent No. 77,985, dated May 19, 1868.*

IMPROVED CUTTING-MACHINE.

*The Schedule referred to in these Letters Patent and making part of the same.*

TO ALL WHOM IT MAY CONCERN:

Be it known that I, WILLIAM H. JOHNSON, of Springfield, in the county of Hampden, and State of Massachusetts, have invented a new and useful Machine for Cutting Pieces to Form from leather, cloth, paper, and other similar materials, and embossing the same; and I do hereby declare that the following is a full, clear, and exact description of the same, reference being had to the accompanying drawings, making a part of this specification, in which—

Figure 1:
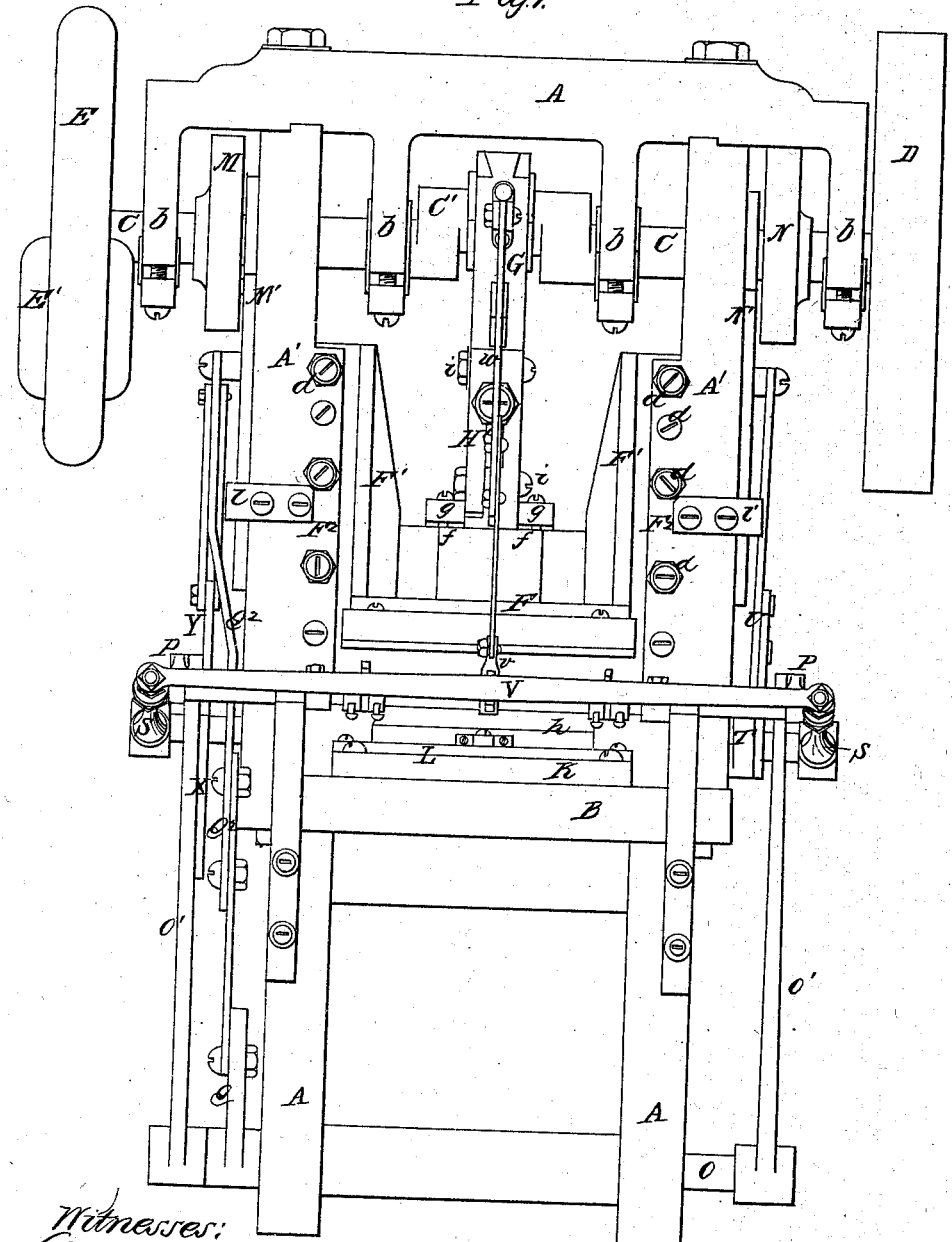
Figure 2:
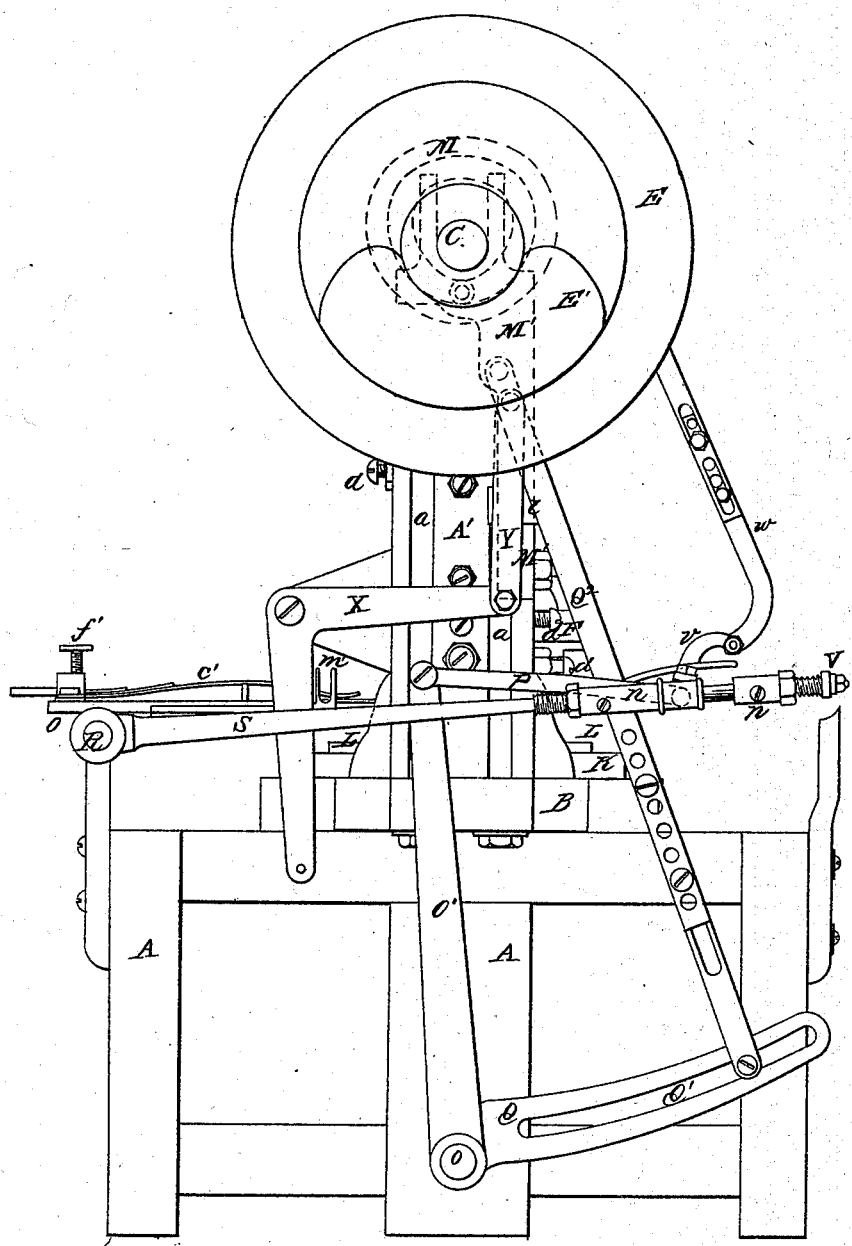
Figure 3:
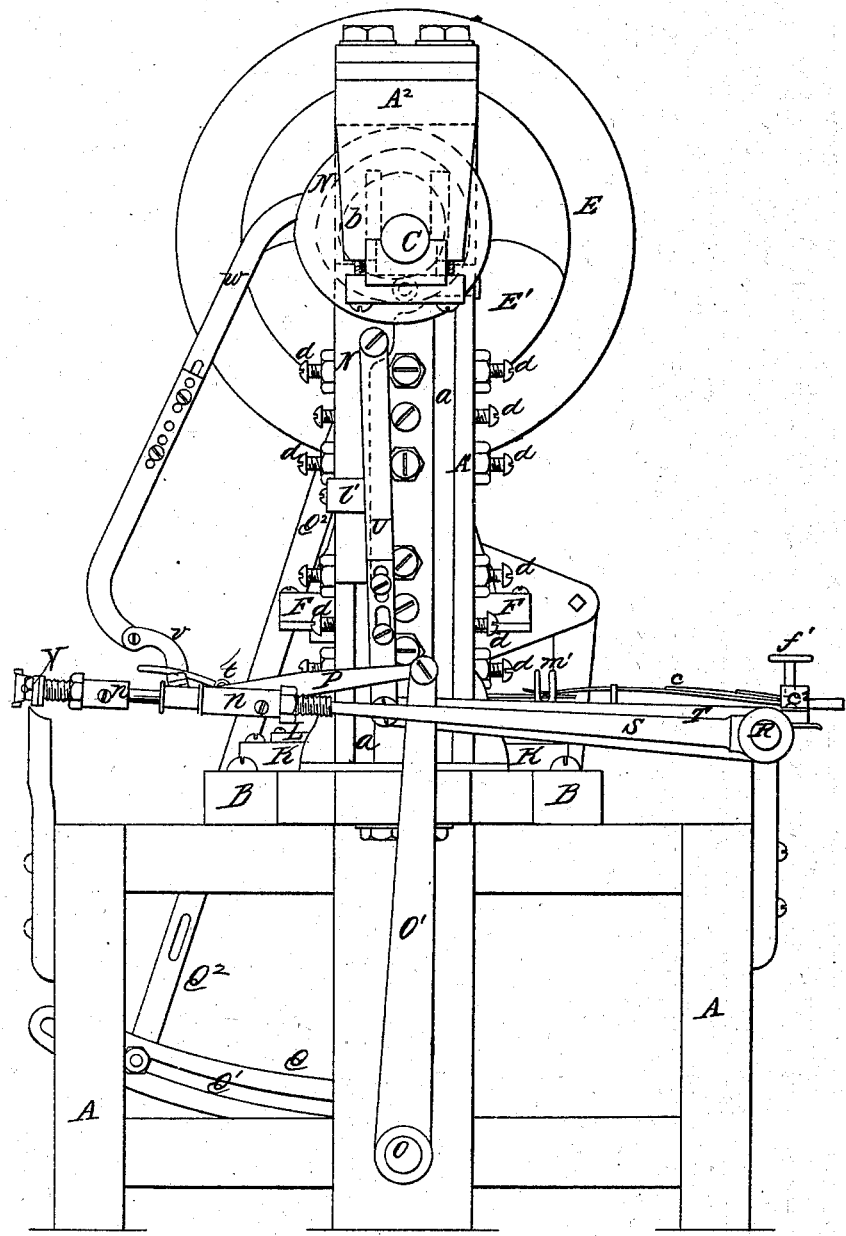
Figure 4:
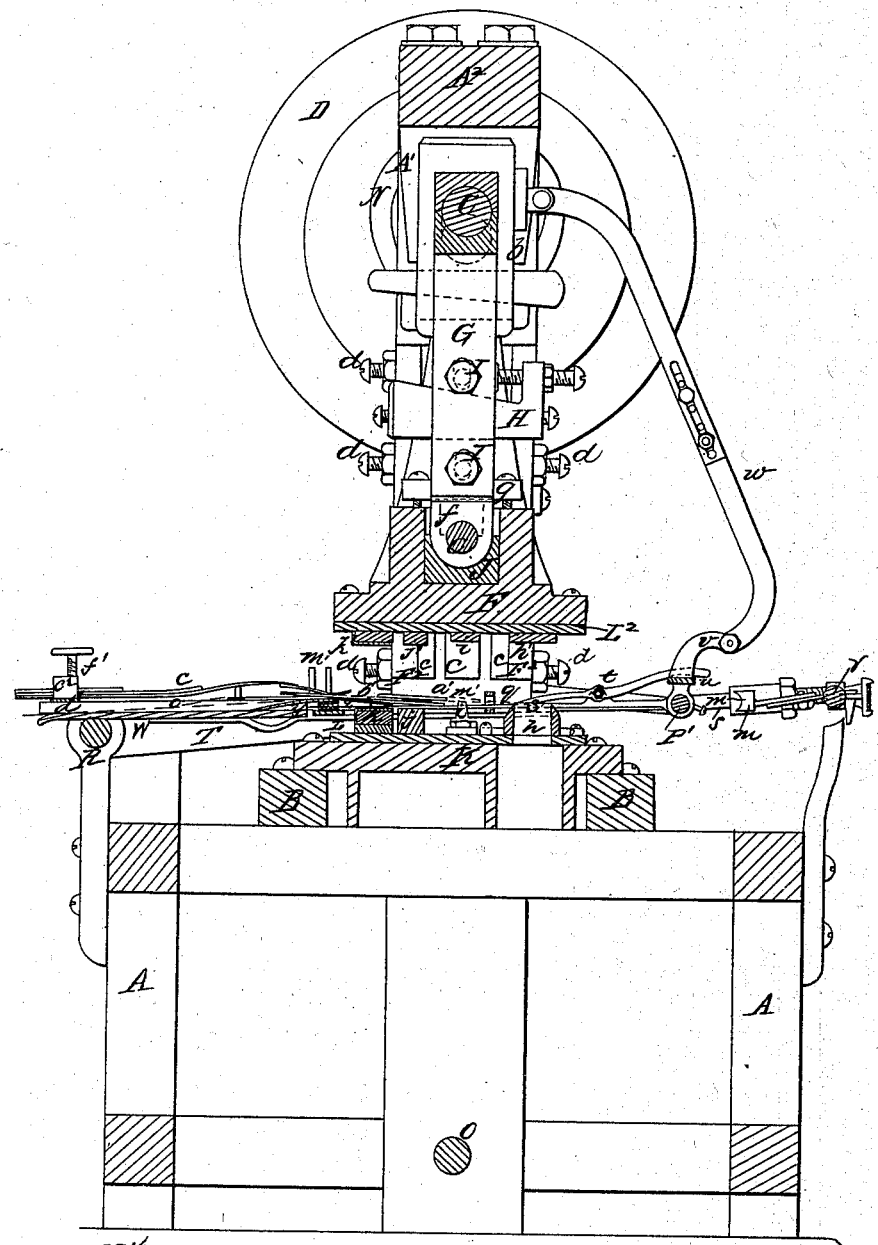
Figure 5:
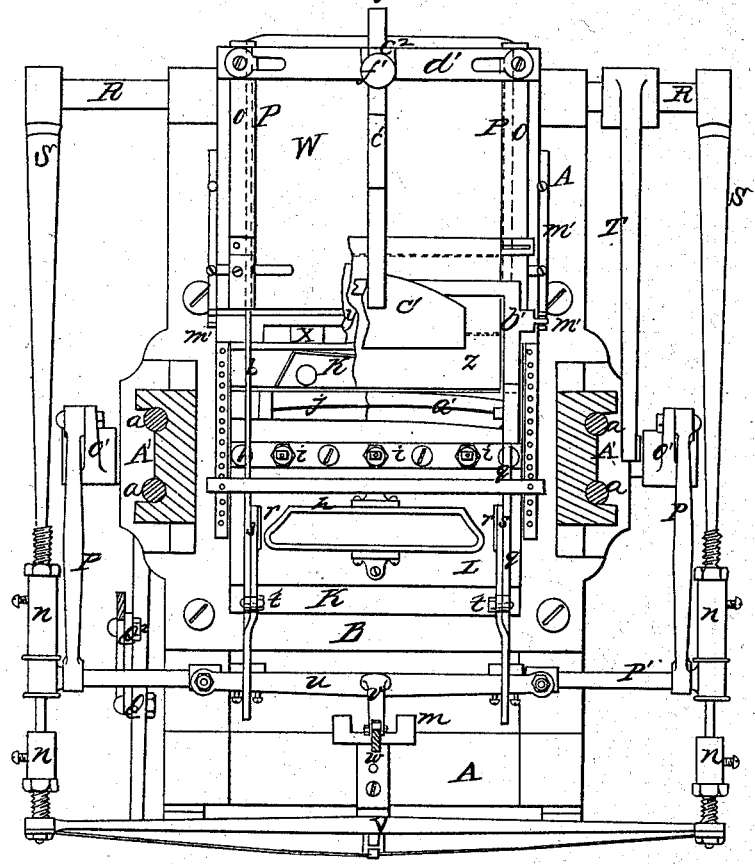

Figure 1 is a front elevation,
Figure 2 is a side elevation,
Figure 3 is an elevation of the opposite side,
Figure 4 is a vertical longitudinal section, and
Figure 5 is a sectional plan.

The same letters refer to the same parts in all the figures.

The subject-matter of my invention consists of certain improvements in machines for embossing and cutting pieces to form from a web or sheet of cloth, paper, leather, metal, or other similar material which may properly be submitted to its action. and is herein shown embodied in a machine arranged for cutting paper collars from two webs of paper.

My invention relates, in the first place, to the manner of constructing and using the cutters by which the object is cut to form, and consists in the employment of a cutter which has a cutting-edge, or an edge that cuts by incision, in combination with a hard surface, as hard as or harder than the cutter, against which the edge of the cutter is forced, and by their contact the material to be cut is severed.

My invention relates, in the second place, to the manner of combining and arranging the machine so as to simultaneously cut and emboss two collars or other objects from two webs or sheets; and consists, first, in placing between the bed and platen, that carry the cutting-apparatus, and in proper relation to the said cutting-apparatus, a duplex embossing-die, placed between the webs or sheets, and having a working-face on either side thereof toward the sheets, in combination with two counterpart-dies or matrices placed outside the sheets upon the bed and platen, by which means both sheets of material will be embossed by one impression; and it consists, second, in the employment, between the bed and platen, and also between the sheets of material to be embossed, of a thin plate, covered with some slightly-yielding material like cloth, if necessary, in combination with a pair of embossing-dies, placed exterior to the webs, and opposite to each other on the bed and platen and forced against the material by the impression; the first-mentioned combination, being used in the machine shown, is to emboss the folds of collars, and the last to emboss the semblance of stitching; and it consists, third, in the manner of arranging and combining, in a machine for cutting collars, the cutters which cut the collars to form, the button-hole cutters, the dies that emboss the folds, and the dies that emboss the stitching, in connection with the other essential parts of the machine, by which one or more finished collars are formed at each revolution of the main shaft.

My invention relates, in the third place, to the manner of constructing the connecting-rod or pitman, which forces the platen against the bed, so that its length may be nicely adjusted to adjust the pressure without disturbing the bearings, and consists in forming the pitman in two parts, united by a top offset-joint, secured together by bolts, and between the offsets of which a taper-key is inserted, by means of which the pitman may be lengthened or shortened to adjust the same, and, at the same time, be unyielding.

In the drawings, A is the frame of the lower portion of the machine, across the top of which is placed the bed-plate B. On the bed-plate are erected the standards $A^1$ $A^1$, which support the cross-beam $A^2$, the whole being firmly bolted together by the tie-bolts $a$ $a$.

C is the main driving-shaft, from which all the necessary movements are derived to operate the machine. The shaft C is supported in the bearings $b$ $b$, projecting downward from the cross-beam $A^2$, as shown. D is the driving-pulley, by means of which the shaft C is set in motion, and E is the fly or balance-wheel, having a counterbalance-weight, E', attached to it, the purpose of which is to enable the operator to stop the machine at any desired point in the revolution of the crank-shaft without danger of accident, by the falling of the platen, while the dies are being put in.

The shaft C is also provided with a crank, C', near the centre of its length, for the purpose of operating the platen F, to which it is attached by means of the connecting-rod or pitman G. The platen F is guided in its vertical movement by means of the long guide-pieces F¹, formed on the same, which work in the guides F², formed on the standards A' A', and provided with gibs $c$ $c$ and gib-screws $d$ $d$, by means of which the wear of the parts may be taken up, and the platens may be adjusted laterally, if necessary. It may also be adjusted in a vertical direction, by increasing or diminishing the length of the connecting-rod G, which may be very readily accomplished by means of the key H and holding-bolts I I; the connecting-rod being made in two parts halved together, as shown, and bolted together by said bolts, the bolt-holes being slotted in one of the parts, so as to allow of the parts being forced apart by the key H, which is inserted between the offsets on the two parts of the connecting-rod, as shown, when the nuts of the bolts I have been slackened, or *vice versa*.

The platen F has a recess in it, into which the half box J is fitted, directly under the lower end of the connecting-rod G, and in which it vibrates as in a socket as the crank revolves. The connecting-rod G has a steel pin, $e$, fitted into it, concentric with the curve of its lower end, and projecting from either side a sufficient distance to receive the half box $f$ on its upper side, with the cap $g$ over it, which is bolted firmly to the platen F, thus attaching the connecting-rod to the platen in such a manner that any wear of the pin or boxes may be easily corrected.

The bed-plate B has a large hole cast in its centre, as shown in fig. 4. On the top of and bolted to the bed-plate B is the die-bed K, having such openings through it as may be required to allow the portion of material cut out to pass through, and being strongly ribbed on its under side around said openings.

L is the lower die-plate, to which are attached the cutter $h$, the button-hole cutter $i$, the lower female die $j$ for embossing the folds of the collars, and the lower stitch-embossing die $k$.

Attached to the under side of the platen F is the upper die-plate L², to which are attached the stitch-embossing die $k'$, the upper female die $j'$ for embossing the folds of the collar, and the two hardened-steel plates $i'$ and $h'$, against which the cutting-dies act to cut the material.

The cutters $h$ and $i$ are made of steel, with an opening through them of the form of the article to be cut; the opening being largest at the bottom to allow the piece of material cut out to drop through them into a receptacle placed below.

The upper edges of the cutters are ground to a perfectly level surface, as are the hardened-steel plates $h'$ and $i'$, so that when the platen is moved down, so as to bring the steel plates $h'$ and $i'$ on to the cutters $h$ and $i$, there shall be practical contact over the whole surface of the cutting-edges. The hardened-steel plates $h'$ and $i'$ will serve for any form of die, the outlines of which do not extend beyond the limits of their surfaces. The cutters are then ground on the outside, with a bevel, as shown, to nearly a knife-edge, but having a perceptible thickness of metal, say, about one-hundredth of an inch at the extreme edge. The hardened-steel plates and the cutters should not have any lateral or sliding motion on each other, as that would break the edge of the cutters.

M and N are cams, which operate the feed-works. M' and N' are plates or bars, having a vertical sliding motion in bearings $l$ and $l'$ on the standards A' A', and operated by the cams M and N. O is a rocker-shaft, mounted in suitable bearings in the frame A, and carrying on its outer ends the arms O', which are connected at their upper ends, through the medium of the links P, to the feed-rod P'. At or near one end of the rocker-shaft O is also firmly attached the arm Q, containing the curved slot Q¹, by means of which the link Q², attached by its upper end to the plate M', may be adjusted, so as to vary the amount of vibration of the rocker-shaft O, and thereby increase or diminish, at pleasure, the amount of feed given to the material to be cut.

The cam M, the sliding plate M', the rocker-shaft O, the arms O' and Q, and the links P P and Q², serve to give a forward and backward motion to the feed-rod P', and thereby, through its connection with the feed-nippers, to be hereafter explained, to feed the paper forward a given distance at every revolution of the machine.

R is a rocker-shaft, supported in suitable bearings bolted to the back end of the machine, and carrying at its outer ends the radial guide-rods S S and the arm T, which is connected to the sliding plate N' by means of the adjustable link U, all of which serve the purpose of lifting the material off from the dies while it is being fed forward.

The front ends of the radial guide-rods S S are tied together by the truss-tie rod V, to which is attached, near the centre of its length, the adjustable stop $m$. Each of the radial guide-rods S S is also provided with two adjustable tubular stops $n$ $n$, which stops serve the purpose of limiting the movement of the feed-rod P' in either direction, and thereby insure a greater degree of accuracy to the feeding of the material than could otherwise be obtained.

The sheet-metal plate W is attached to the rocker-shaft R at or near its rear end, and extends forward nearly to the stitch-embossing dies, and has two guide-bars $o$ $o$, attached to its upper side by means of bolts passing through slots in the plate W, so that the guide-bars may be adjusted to fit different widths of material. The guide-bars $o$ $o$ have rectangular-shaped grooves $p$ $p$ formed in their under sides, which form bearings for the rear ends of the nipper-bars $q$ $q$, and in which they are moved forward and back by the feed-rod P', to which they are attached, at their forward ends, in such a manner that they may be adjusted, in connection with said bars, to any width of material.

The nipper-bars $q$ $q$ have lips $r$ $r$ projecting from their inner sides, which form the lower or fixed jaws of the feed-nippers. The movable jaws $s$ $s$ are attached to the nipper-bars $q$ $q$ by the fulcrum-pins $t$ $t$, and are operated to clamp or release the material to be fed, by the vibratory motion of the bar $u$ around the feed-rod $P'$, upon which it is hung, which motion is obtained from the movement of the upper end of the pitman or connecting-rod G, by means of the curved arm or lever $v$ and the adjustable curved link $w$.

On the forward end of the sheet-metal plate W, and just in the rear of the dies, is placed the spring $x$, on which rests the curved pressure-plate $y$, over which the material to be cut passes, and by which it is raised above the dies when the platen is moved up, and holds the material up to the plate while it is being fed forward.

To enable me to emboss the imitation of stitching on the collars or other articles at the same time, I interpose between the two stitch-embossing dies, attached to the bed and platen, a sheet-steel plate, Z, enclosed in a covering of cloth or other yielding material, and between the two sheets of paper or other material to be operated upon, so that, when the platen is moved down by the revolution of the crank, so as to submit the material to pressure, the action of the two stitch-embossing dies, whose working-faces are towards each other, are also toward the steel plate Z, shall emboss an imitation of stitching on the under side of the lower sheet or web of material, and on the upper side of the upper sheet or web.

To enable me to emboss the line of fold in two sheets of material at the same time, I place between the two sheets the duplex die or rib $a'$, having its upper and lower edges alike, and curved to correspond to the grooved dies attached to the platen and bed, so that, as the platen is moved down, said rib or blade is forced into the paper or other material, and the material is forced into the female or grooved dies $j$ and $j''$, and embosses a line across each sheet of material in the position for folding the collar.

The duplex die or rib $a'$ is attached to the skeleton frame $b'$, which is connected to the sheet-metal plate W, and is held in position, with relation to its female dies, by means of the adjustable forked bearings or lugs $m'$.

The spring-plate $c^1$, attached to the bar $d'$, at the rear end of the machine, by means of the sockets $c^2$ and the set-screw $f'$, serves the purpose of a friction-plate, and, in connection with the plate $y$ and spring $x$, attached to the sheet-metal plate W, and placed under the sheet of material, acts as a drag on the material while it is being fed forward by the nippers, and thereby presenting a smooth surface to the action of the dies.

The lever X and link Y are for the purpose of conveying motion to the apparatus for unwinding the material from the roll, which may be accomplished in several well-known ways.

The guide-bars $o\ o$ and the nipper-bars $q\ q$ are so arranged that they may be readily adjusted to adapt the machine to cutting from different widths of material.

The motion of the feed-rod $P'$ and the nipper-bars $q\ q$ in a horizontal direction, and consequently the feed of the material, may be increased or diminished at pleasure, by means of the curved slotted arm Q and the link $Q^2$, when it is desirable to cut a wider or narrower collar, in which case the cutting and embossing-dies will be arranged on their plates at a greater or less distance from each other, while the pad containing the steel plate Z will be adjusted to agree with their accompanying dies.

The operation of machine is as follows:

The free ends of the two sheets or webs of paper, or other material to be cut, are drawn into the machine in the position shown by the red lines in fig. 4, until they are inserted between the jaws of the feed-nippers, the two sheets passing under the bar $d'$, and between it and the plate W, and in contact with each other, till they arrive at the plate Z, when they are separated, the lower one passing under the plate Z, and between it and the plate $y$, also under the duplex die or blade $a'$, then passing over the button-hole collar cutters till it reaches the nippers. The upper sheet passes over the plate Z, and between it and the spring-plate $c^1$, and over the duplex die or blade $a'$, where it again comes in contact with the lower sheet.

The ends of the two sheets being placed between the jaws of the nippers, and the machine being set in motion, the cam M begins to act upon the sliding plate $M'$, and, through the intervening links and arms, the motion is conveyed to the rod $P'$, to which the nipper-bars are attached, and, as the vibrating-bar U is in such position as to force the forward end of nipper-lever or jaw in an upward direction, the rear end will be firmly pressed on to the material; and as the feed-rod $P'$ is moved forward, the material will be moved forward with it.

Just as the forward movement of the feed-nippers is completed, the cam N begins to act on the plate $N'$, and, through the link U and arm T and radial guide-rods S S, to lower the material till it rests on the die, at which point the platen comes in contact with it, and a very slight continuation of the motion of the shaft forces the cutter $h$ through the paper, cutting out two collars; and at the same time the cutters $i$ cut the button-holes $c$ in the next two succeeding collars, while the duplex die or blade $a'$, between the two sheets, has forced the material into its corresponding female dies, and embossed a curved line across each sheet, at the proper point for the fold of the next succeeding collars, and the imitation of stitching is embossed by the stitching-dies acting upon the top and bottom of the two sheets, with the steel plate Z between them.

As soon as the platen has arrived at its lowest position, the action of the upper end of the pitman or connecting-rod, while passing the dead-centre, serves to open the nippers and release them from the paper, at which point the action of the cam M upon the feed-rod $P'$ moves the nippers back to the point from which they started at the commencement of the revolution, and in readiness to take a new hold upon the paper.

While the platen is approaching its highest position, the cam N is acting, through the plate $N'$, link U, arm T, and rocker-shaft R, upon the radial guide-rods $s\ s$, to raise the paper from the dies, so that it may be again fed forward.

During each successive revolution of the machine, the same movements take place, the feed-works feeding the material forward a distance equal to the width of the collar cut, and the width of the waste that is found desirable to leave between the collars.

The collars that are cut in any revolution of the machine are the ones in which the button-holes were cut in the next previous revolution but one, and the button-holes are cut in the collars on which the folding-line was embossed in the previous revolution, and so on to the end, there being five pairs of collars in process of manufacture at the same time, one pair being cut or severed from the sheet or web, one pair having their button-holes cut, one pair having the fold-line embossed, and one pair having the imitation of stitching embossed thereon, each pair being advanced one step at each revolution of the crank-shaft, and one pair of collars completed and deposited in the receptacle provided for that purpose.

It is evident that the principles of my invention may be applied to other purposes than the cutting of paper collars, such as cutting articles of various forms from cloth, leather, and other similar material, in which case the cutting-mechanism would be adapted to the work to be done.

What I claim as my invention, and desire to secure by Letters Patent, is—

1. The combination of a cutter, having a cutting-edge of the required form, with a plain, hard surface or plate, harder than the cutter, co-operating, substantially as described, as a device for cutting leather, cloth, paper, and other similar material.

2. The employment, in a cutting-machine, of a duplex embossing-die, in combination with two corresponding dies or matrices, placed opposite to each other, and co-operating substantially as described, by which two sheets may be simultaneously embossed upon their contiguous surfaces by the same impression.

3. The employment, in a cutting-machine, of two embossing-dies, placed opposite to each other, and facing toward each other, in combination with a central plate placed between the same, and co-operating substantially as described, by which two sheets may be simultaneously embossed upon their exterior surfaces by the same impression.

4. The employment, in combination, of the cutting-apparatus described, with two sets of embossing-dies, as described, by which the several operations described can be simultaneously performed upon two sheets of material by the same impression.

5. The combination of the central plate with the two yielding pressers placed on opposite sides of the same, substantially in the manner and for the purpose described.

6. The method herein described, for adjusting the length of the pitman, by means of the scarf-joint, and the key inserted between the offsets therein, or substantially as described.

Executed at Springfield, July 29, 1867.

WILLIAM H. JOHNSON.

Witnesses:
GIDEON WELLS,
FRANK H. BRAY.